United States Patent [19]

Van Doorn et al.

[11] 4,249,850
[45] Feb. 10, 1981

[54] APPARATUS FOR LOADING, TRANSPORTING AND UNLOADING MODULES OF SEED COTTON AND THE LIKE

[75] Inventors: Donald W. Van Doorn; Roy T. Williams; James B. Hawkins, all of Columbus, Ga.

[73] Assignee: Lummus Industries, Inc., Columbus, Ga.

[21] Appl. No.: 910,465

[22] Filed: May 30, 1978

[51] Int. Cl.³ .................................................. B60P 1/38
[52] U.S. Cl. ................................. 414/491; 414/474; 414/495; 280/43.23; 198/301
[58] Field of Search ............... 180/140; 280/43, 43.17, 280/43.23; 198/300–310, 511, 863; 414/469, 474, 476, 478, 488, 489, 491, 495, 528, 434

[56] References Cited

U.S. PATENT DOCUMENTS

| | | | |
|---|---|---|---|
| 3,095,570 | 6/1963 | Warner et al. | 414/528 |
| 3,153,544 | 10/1964 | Jung et al. | 280/43.23 |
| 3,209,932 | 10/1965 | Schlitz | 414/491 |
| 3,341,039 | 9/1967 | Cranage | 198/304 X |
| 3,415,400 | 12/1968 | Olin | 414/491 X |
| 3,951,288 | 4/1976 | Hale et al. | 414/491 |
| 4,044,906 | 8/1977 | Schrag et al. | 414/491 X |
| 4,051,961 | 10/1977 | Williams | 198/301 X |
| 4,081,094 | 3/1977 | Pereira et al. | 414/491 X |

*Primary Examiner*—Stephen G. Kunin
*Assistant Examiner*—Terrance L. Siemens
*Attorney, Agent, or Firm*—Jennings, Carter & Thompson

[57] ABSTRACT

A self-powered vehicle especially adapted for handling modules of cotton comprising a single frame which serves not only as a chassis frame for the vehicle, but also serves as a conveyor frame. Apparatus is associated with one set of wheels, either the front or rear set, to raise and lower the frame relative to that set of wheels, thus to place one end of the frame closely adjacent the ground or to a pallet on which the module rests. Apparatus also is provided to drive the vehicle and the conveyor in opposite directions whereby the module may be loaded onto the conveyor without substantial translatory movement of the module. Further details include sensors effective to limit downward movement of the loading and unloading end of the frame; and a control cab mounted immediately adjacent the loading and unloading end of the frame and displaced laterally therefrom.

3 Claims, 18 Drawing Figures

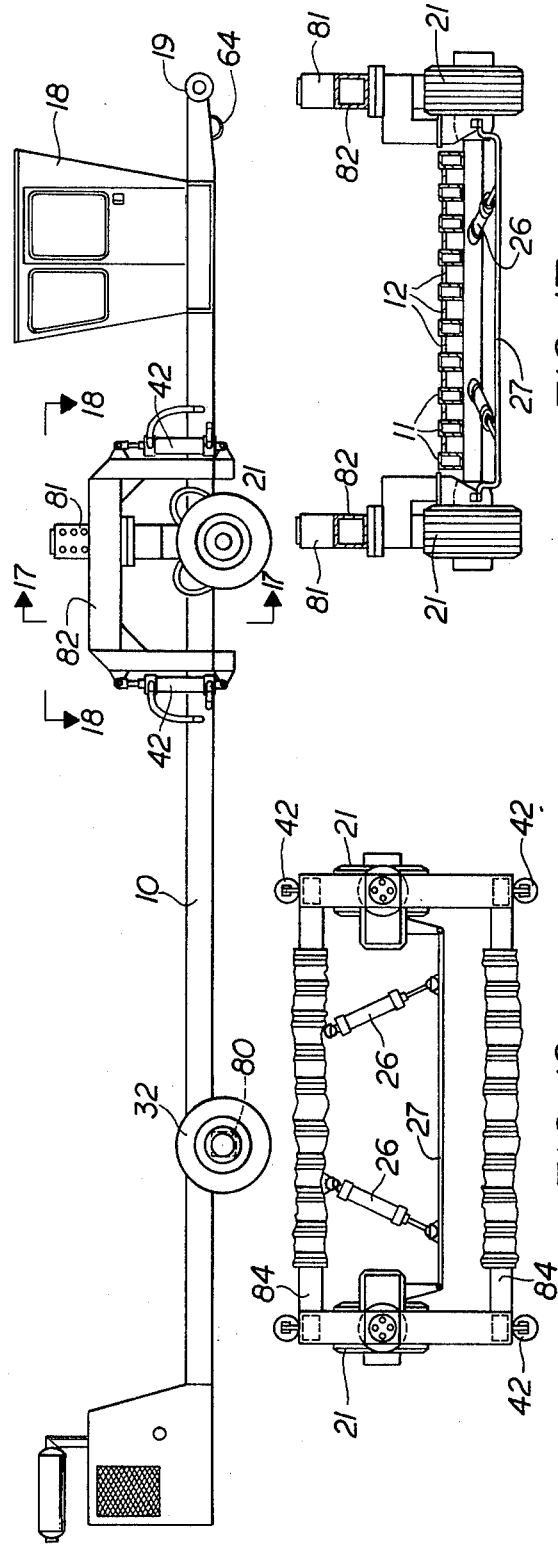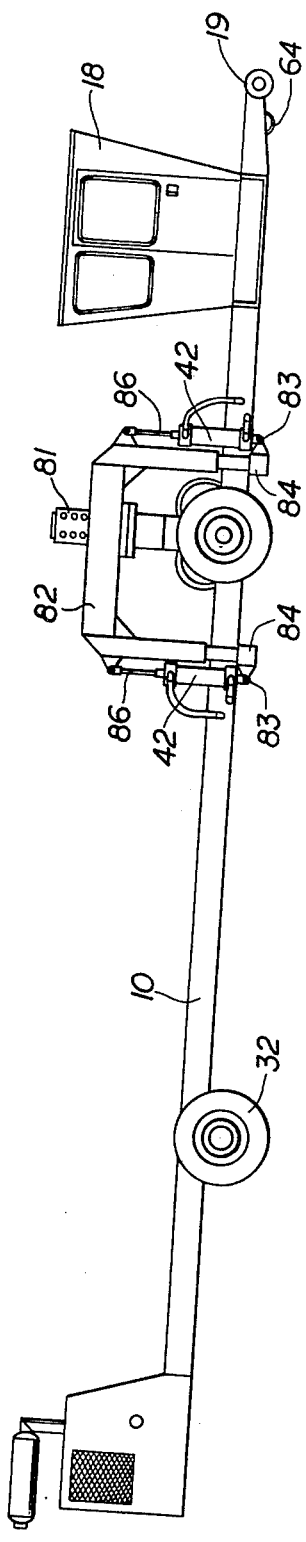

APPARATUS FOR LOADING, TRANSPORTING AND UNLOADING MODULES OF SEED COTTON AND THE LIKE

Our invention relates to a vehicle especially adapted to lift, move, and discharge materials such as modules of seed cotton.

In the handling of seed cotton it is customary to form the cotton as it is picked into what are called "modules". These modules may contain sufficient seed cotton to make 8 to 15 bales of lint cotton, may be 8 feet wide, 8 feet high and on the order of 32 feet in length. These modules may be formed in the field where the cotton is grown and packed by apparatus which compacts the same to a density sufficient to make the module self-sustaining. The module may be formed either on the ground or on a pallet. Heretofore, it has been customary when the module is formed on a pallet to load such pallet onto a vehicle and transport it to the gin, where the cotton thereon is removed for ginning.

An object of our invention is to provide a simplified, fully effective vehicle adapted to load, transport and discharge such modules of cotton, whether the same are resting on the ground or on a pallet.

More in detail, an object of our invention is to provide apparatus especially adapted to handle modules of seed cotton and which comprises a single frame which serves both as a frame for the vehicle itself and as a frame for supporting and mounting a plurality of conveyor elements such as driven chains, which group of chains forms in effect a live deck for receiving the module and discharging the same.

Another object of our invention is to provide a vehicle of the character designated in which the loading and discharge end of the apparatus is raised and lowered relative to the ground by changing the elevation of the frame relative to one of the sets of supporting wheels, which set of wheels may be either those nearest the loading and unloading end of the vehicle or the wheels located at the rear or remote from the loading-unloading end.

Another object of our invention is to provide a vehicle in which the vehicle itself and the conveyor thereon may be driven simultaneously in opposite directions so that the vehicle may load or discharge a module of cotton without the module itself moving appreciably relative to the ground or other surface on which it either rests or is to be placed.

Another object is to provide sensing means adjacent the loading-unloading end of the frame effective to prevent the end of the conveyor from digging into the surface of a pallet or the ground, thus preventing damage to the pallet itself as well as to the attachments on the conveyor chains.

Yet another object is to provide a vehicle of the character designated in which the operator's cab is placed closely adjacent the loading-unloading end of the frame and in which the same is laterally offset so that the operator has full view of the loading operation and yet the cab is out of the way so that it does not interfere with the loading and unloading of the module.

Briefly, our invention contemplates a vehicle comprising a single frame which serves both as the chassis frame and the conveyor frame. The frame is supported adjacent one end by a set of non-steerable wheels, hereafter called the rear wheels, and by a set of steerable wheels located adjacent the loading-unloading end of the conveyor, hereafter called the front wheels. Associated with a selected set of said wheels, either front or rear, are hydraulic cylinders connected so that the frame may be raised relative to the set of wheels with which such cylinders are associated. In this fashion the other set of wheels acts as a pivot point so that the loading-unloading end of the conveyor may be lowered to ground level or to the top of a pallet, thereby to receive the module as the conveyors are driven rearwardly while the vehicle itself moves forwardly at substantially the same linear rate. Preferably, the hydraulic cylinders controlling the raising and lowering of the frame are cross-connected so that the frame itself remains substantially level even though one or the other of the wheels drops into a low spot or rides upon a high spot, thus minimizing twisting of the frame.

A vehicle illustrating features of our invention is shown in the accompanying drawings, forming a part of this application, in which:

FIG. 15 is a view corresponding to FIG. 1 and showing a modified form of our invention in which the front wheels are equipped with the mechanism to raise and lower the frame relative thereto;

FIG. 16 is a view corresponding to FIG. 2 and showing the modified form of our invention in position to receive a module;

FIG. 17 is an enlarged detail sectional view taken generally along line 17—17 of FIG. 15; and FIG. 18 is an enlarged detail plan view taken generally along line 18—18 of FIG. 15.

Figure 1:
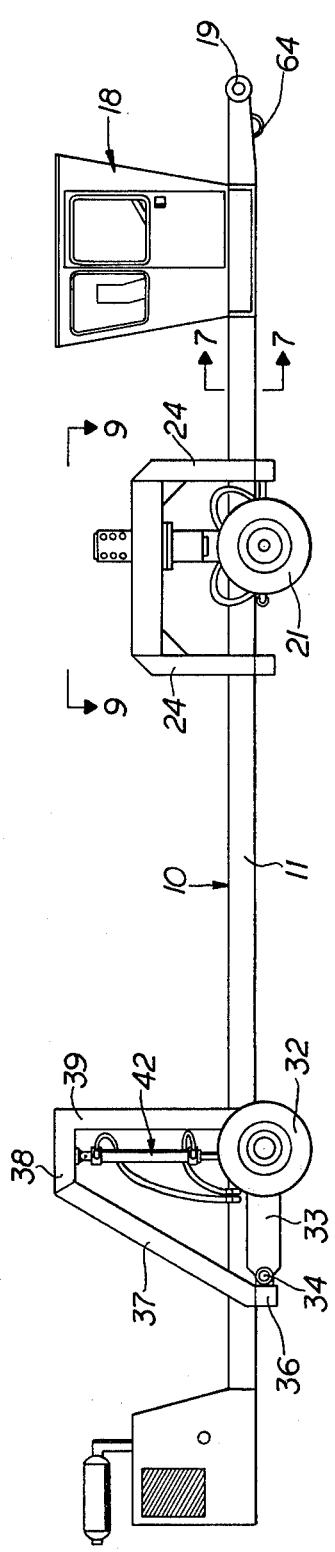
FIG. 1 is a side elevational view of our improved vehicle with the parts in transport position and with the raising mechanism associated with the rear wheels.
Figure 2:
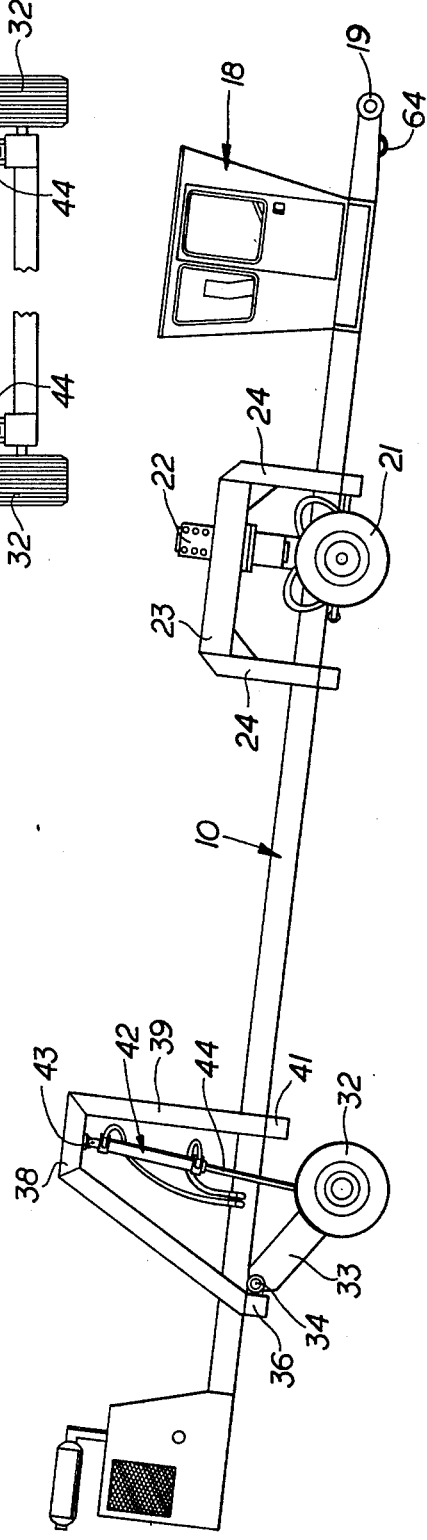
FIG. 2 is a side elevational view of our vehicle corresponding to FIG. 1 and showing the same with the parts in position to receive and lift a module of cotton.
Figure 3:
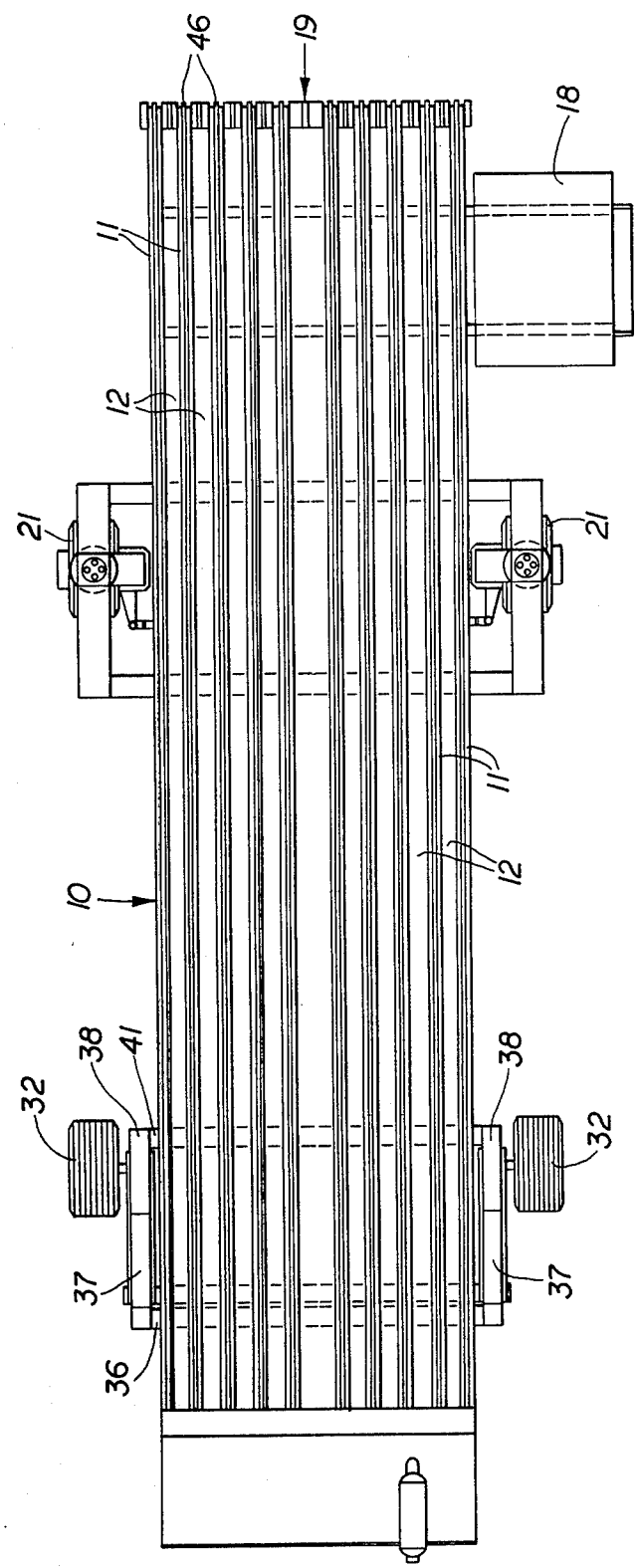
FIG. 3 is a plan view of the vehicle shown in FIGS. 1 and 2.
Figure 4:
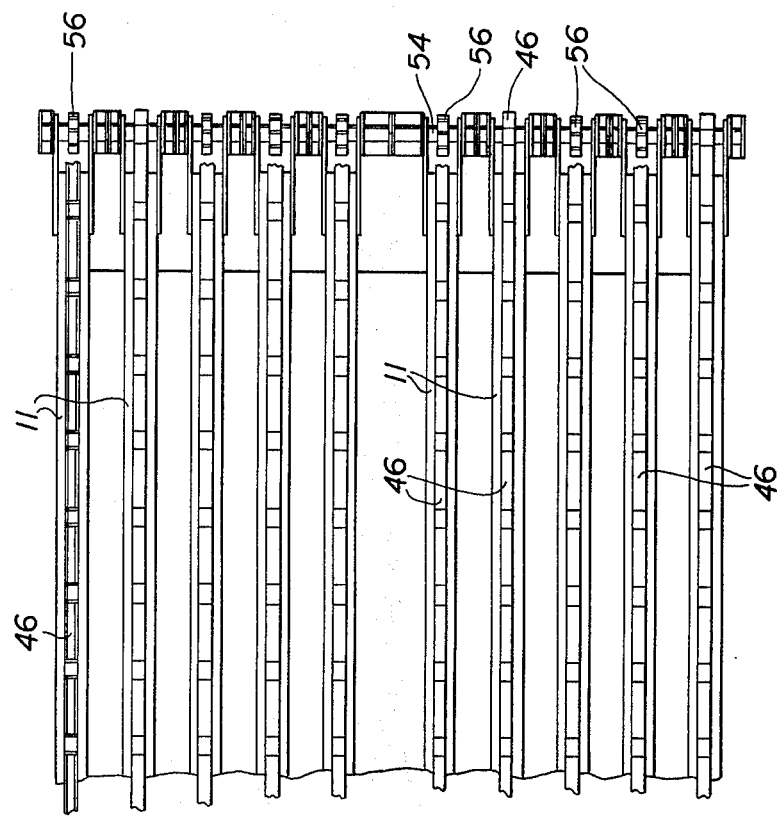
FIG. 4 is an enlarged plan view partly broken away and in section and illustrating the drive for the conveyors.
Figure 4:
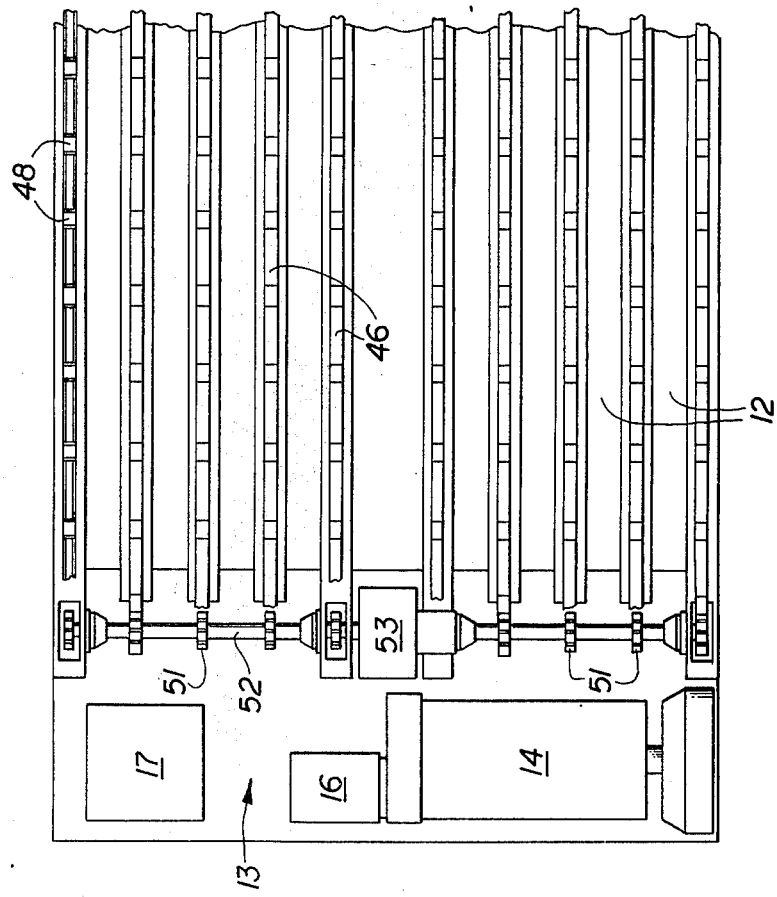

Referring now to the drawings for a better understanding of our invention it will first be noted that except for the difference in location of the frame raising and lowering mechanism, the modification shown in FIGS. 15 and 16 is the same as that shown in FIGS. 1 and 2. Therefore, except as hereinafter noted, the description applies to both modifications.

The vehicle comprises essentially an elongated frame indicated generally by the numeral 10, which as will appear, acts both as the chassis frame and as a conveyor frame. Thus, the frame 10 comprises a plurality of longitudinally extending hollow, tube-like members 11. These are cross-braced by suitable plates 12 located near the tops of the frame members 11. There may be intermediate cross members if desired, all to the end that members 11 are fabricated into a unitary, strong frame capable of supporting the load as will appear and also capable of acting as a chassis frame.

The frame members 11 carry at their rear ends a supporting deck plate 13 on which is mounted a prime mover such as a diesel engine 14, which engine drives a pump 16. Fluid may be stored in a reservoir 17.

Figure 5:
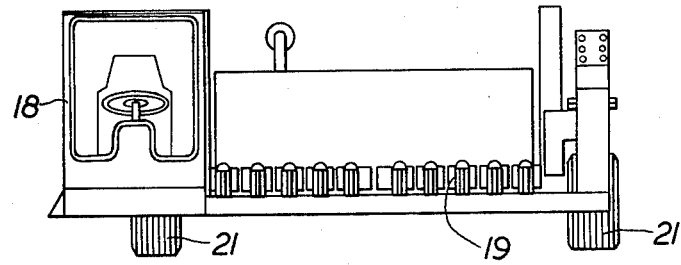
FIG. 5 is a front view of the apparatus as shown in FIG. 1.
Figure 6:
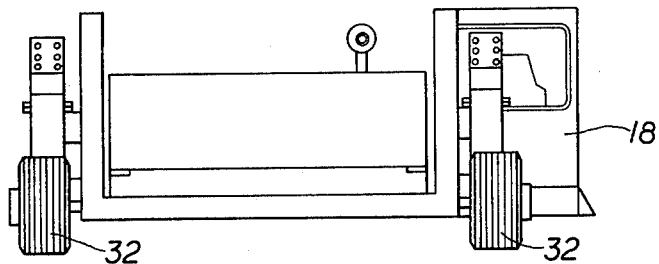
FIG. 6 is a rear view of the apparatus as shown in FIG. 1.

Adjacent the front of the frame is an operator's cab 18. It will be noted that this cab is offset laterally of the frame as shown in FIGS. 5 and 6 but that it is located near enough to the loading-unloading end of the frame indicated at 19 to afford the operator a good view of the loading and unloading operation.

Steerable wheels 21 are mounted on suitable axles and each is individually driven by hydraulic motors 20. The wheels may be individually mounted for rotation on vertically disposed columns 22, the columns in turn being supported on fore and aft elevated members 23 in turn made fast to the frame by vertical members 24. Steering is accomplished by means of a pair of double acting fluid cylinders 26, a cross rod 27 and linkages 28. It will be understood that fluid may be admitted selectively to the cylinders 26 through openings 29 and 31 so that the wheels 21 pivot in unison either to the right or left.

Rear sets of wheels 32 are carried on axles in turn mounted on the ends of links 33 which are pivoted at 34 to a cross member 36 spanning the frame 10. Connected to the cross member 36 at each side of the frame are upwardly and forwardly extending members 37 which in turn carry a horizontal upper member 38. Another vertical member 39 connects at its lower end to another cross member 41 passing beneath the frame 10.

Double acting hydraulic cylinders are pivotally mounted at 43 to the member 38. The piston rods 44 of cylinders 42 are pivotally connected to the links 33.

From what has so far been described it will be seen that by admitting fluid under pressure to the lower ends of the cylinders 42 the entire frame is raised at its rear end, pivoting about the wheels 21, thereby lowering the front end 19 close enough to the ground or to a pallet to receive a module resting thereon.

Figure 7:
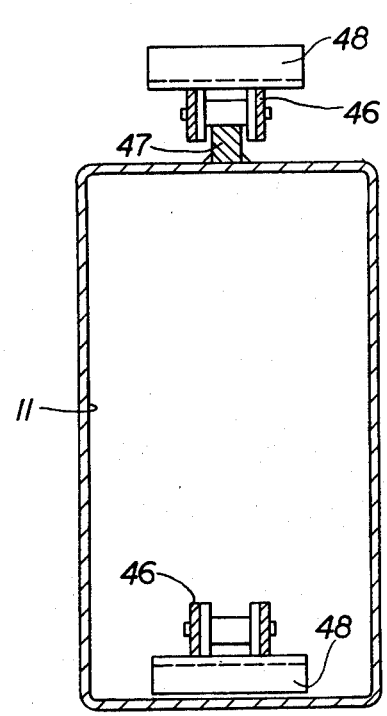
FIG. 7 is an enlarged detail view through one of the members of the frame taken generally along line 7—7 of FIG. 1.
Figure 8:
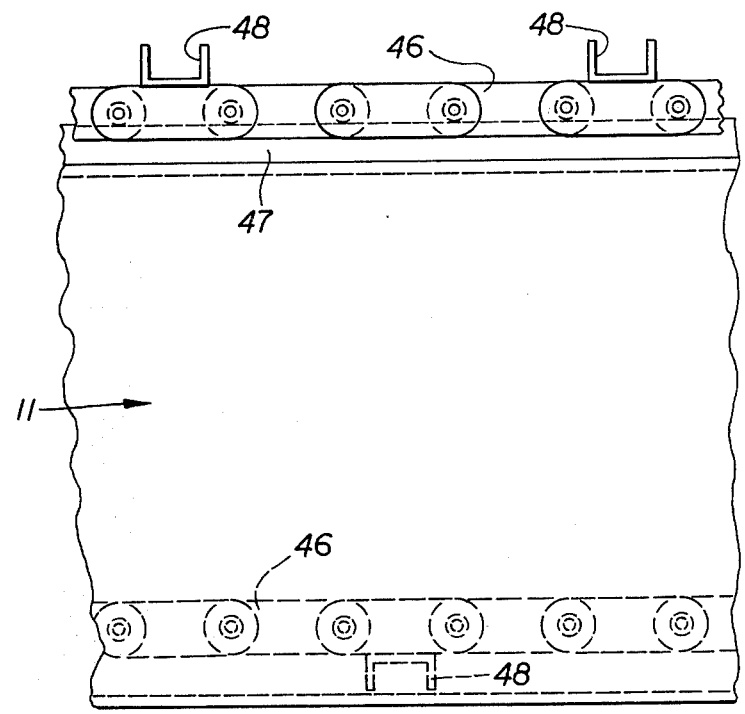
FIG. 8 is a detail fragmental side elevational view of the frame and chain shown in FIG. 7.
Figure 9:
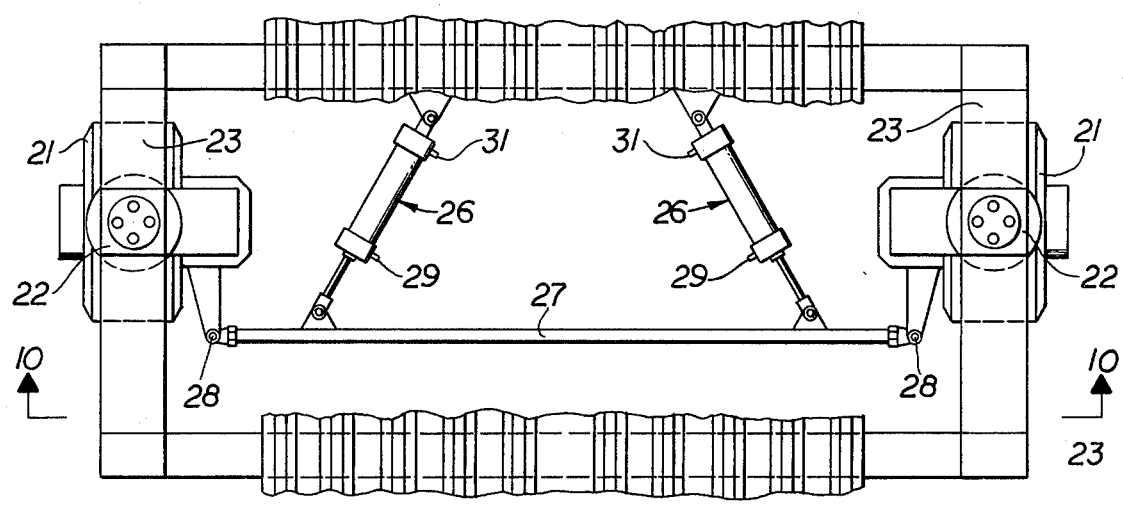
FIG. 9 is a fragmental, enlarged detail plan view taken generally along line 9—9 of FIG. 1.
Figure 10:
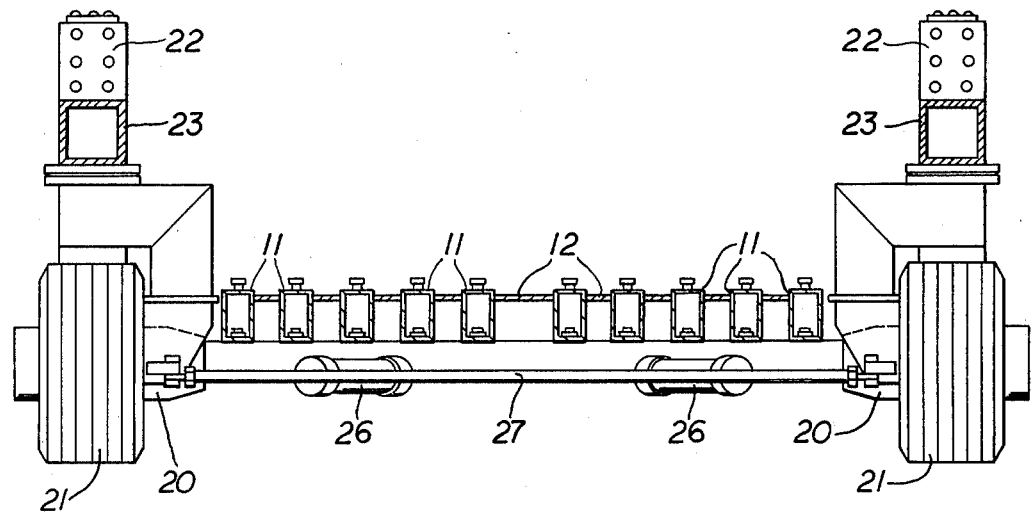
FIG. 10 is a detail sectional view taken generally along line 10—10 of FIG. 9.

The live deck for our improved apparatus may comprise a plurality of chains 46 mounted to ride on members 47 carried on the tops of members 11. The chains may return through the members 11 as indicated in FIGS. 7 and 8. The chains may carry attachments 48 to aid in frictionally gripping the lower surface of the module.

The chains pass over sprockets 51 which in turn are mounted on a shaft 52 driven by a hydrualic motor 53. Thus, the chains may all be driven in unison by applying fluid under pressure from the pump 16, in the fashion will known, to the motor 53.

At the forward end we provide a shaft 54 carrying sprockets 56 over which the chains 46 pass. Thus, when the motor 53 is energized the chains can be driven rearwardly at selected speeds.

Figure 14:
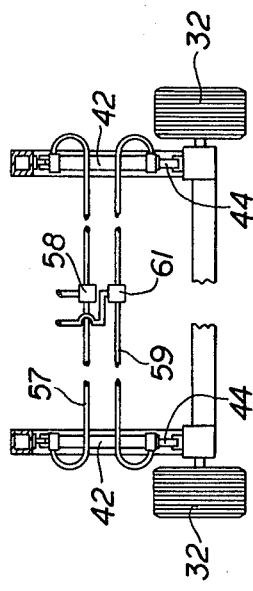
FIG. 14 is a fragmental end elevational view illustrating the cross-connection of the frame raising and lowering cylinders.

Referring particularly to FIG. 14 we show means to cross connect the cylinders 42 so that if one of the wheels 32 encounters a high or low place in the ground while the frame is tilted for loading a module the frame 10 remains substantially level, thus to prevent twisting. As shown, we cross connect the upper ends of the cylinders 42 by means of a line 57 under control of a valve 58. Similarly, we cross connect the lower ends of cylinders 42 by a line 59 under control of a valve 61. In operation, it will be seen that with the rear end of the frame raised as shown in FIG. 2, the piping arrangement illustrated in FIG. 14 is such that if, for instance, the right hand wheel were to run into a depression, the fluid in the respective upper and lower ends of the cylinders 42 would displace so as to lower the piston rod 44 of the righthandmost cylinder a greater distance than it was when the wheels were level. The reverse is true relative to the lefthand cylinder as viewed in FIG. 14, thereby maintaining frame 10 substantially level, preventing twisting or warping of the same.

Figure 13:
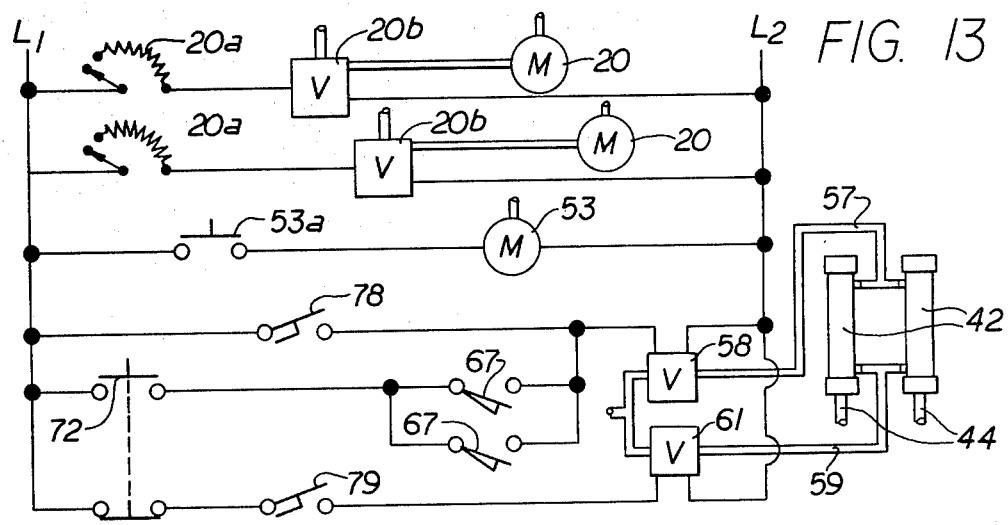
FIG. 13 is a schematic wiring and hydraulic diagram.
Figure 11:
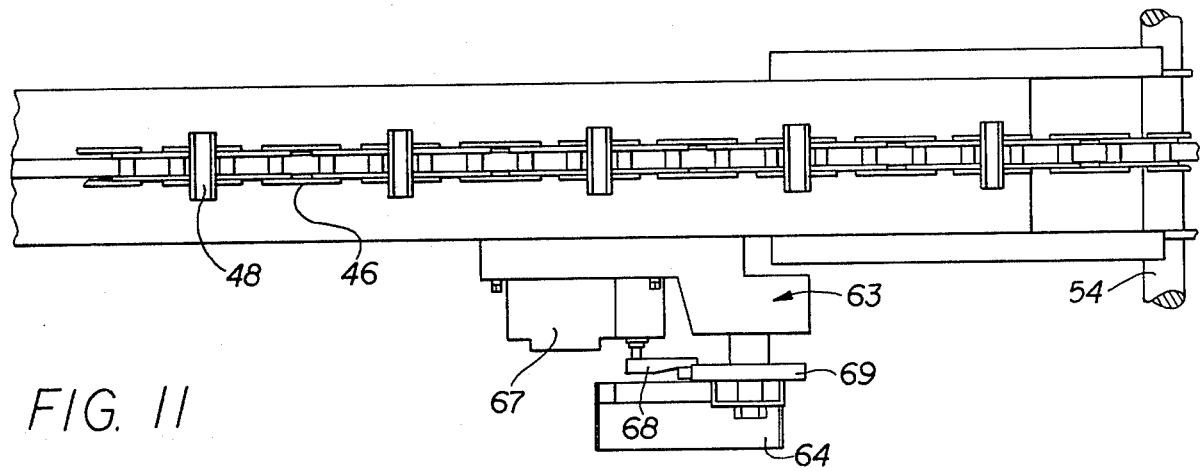
FIG. 11 is an enlarged, detail fragmental plan view of a portion of the frame and conveyor adjacent the loading-unloading end thereof.
Figure 12:
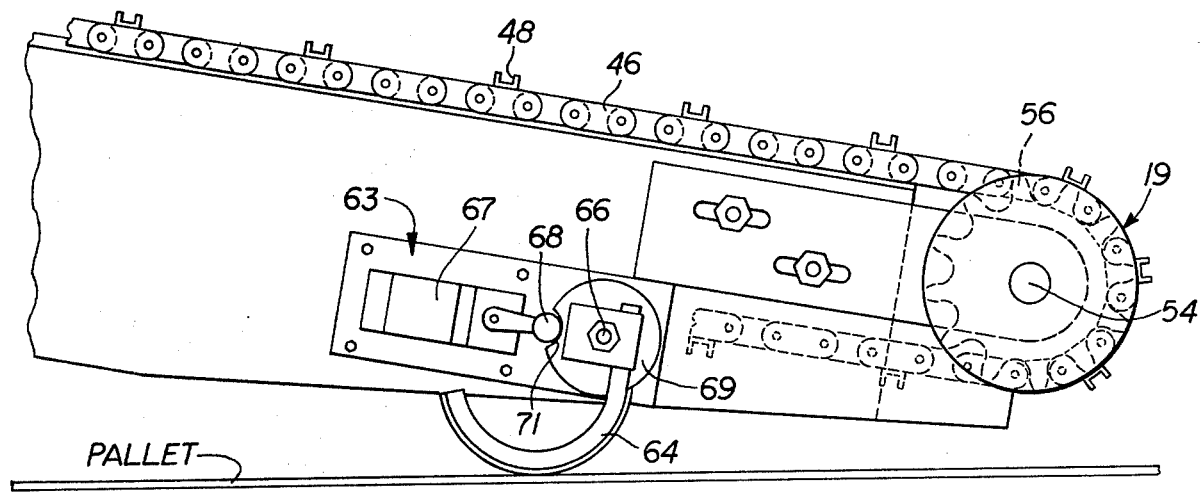
FIG. 12 is a side elevational view of the portion of the apparatus shown in FIG. 11 with the frame tilted to lowered position.

Referring now particularly to FIGS. 11, 12 and 13 approximately at each corner of the frame 10, adjacent the loading-unloading end, we mount means to sense the level of the loading-unloading end of the conveyor relative to a given surface. For instance, if a module is to be picked up from a pallet, it is desirable to stop the downward movement of the loading-unloading end 19 to a point just above the level of the pallet so that the chains will not dig into its surface. To this end we mount adjacent each corner an over travel control member indicated generally by the member 63. This unit may be purchased from Allied Steel and Conveyor Company Division of Sparton Corporation, 17333 Healy Avenue, Detroit, Mich. 48212, their catalog number S-406-D/F. As will be understood, this unit comprises a shoe or feeler member 64 which is pivoted as at 66. A switch 67 has its switch arm 68 cooperating with a member 69 which is rotatable by the pivotal movement of the feelers 64. Whenever the switch arm 68 is in a notch 71 on the member 69 the switch is open. It will be understood that the members 64 are spring returned to a position that the arm 68 remains in the notch 71 until such time as the feeler member 64 moves clockwise as viewed in FIG. 12, namely, moves clockwise in response to lowering of the end 19 of the frame slightly lower than shown in FIG. 12.

Referring to FIG. 13 we show an electrical and hydraulic control system in which the lowering of the end 19 of the frame may be halted by the members 64 and their associated mechanisms. Also, we illustrate in FIG. 13 controls for the wheel motors and conveyor motor. First, it will be understood that the system includes a pallet sensor on or off switch 72 which is a manual switch. In other words, with the switch in the position of FIG. 13 the sensors are not in operation and the end of the conveyor 19 may be lowered even to the point that the chains dig into the ground.

The valves 61 and 58 may be solenoid controlled for respective down and up movement of the piston rods 44. In other words, valve 58 when open passes fluid under pressure through the line 57 to the upper ends of the cylinders 42, forcing their pistons downwardly, thus raising the frame at its rear end and lowering the frame at its end 19. Solenoid valve 61 when energized permits fluid to flow from the lower ends of the cylinders 42, thus to permit the main frame of the vehicle to return to substantially horizontal position.

When the switch 72 is in open position as shown in FIG. 13 the respective valves 61 and 58 may be controlled by foot operated switches 78 and 79. The wheel motors 20 may be operated at variable speeds through the switches 20a and valves 20b, while the conveyor motor 53 is under control of a switch 53a. We have simplified the showing of the hydraulic system in FIG. 13 and have omitted return lines and the like for the sake of clarity of illustration and description.

From the description so far given the method of operating our improved vehicle and the several advantages thereof may now be more fully explained and understood. It will be understood that the controls to operate the motor for the conveyor and the motors for the driving wheels 21 are operable separately. The reason for this is that it is sometimes desirable, for instance, when operating on wet or slippery ground, to drive the wheels 21 at a slightly faster rate than they normally would be driven on firm ground to keep the translatory movement of the vehicle substantially equal to the rearward movement of the conveyors.

With the apparatus constructed and arranged as illustrated the operator drives the apparatus up to the end of a module to be raised and transported. He then actuates the cylinders 42 through the switches 78 and 79, it being understood that the switch 72 is in the open position in the instance being described. This raises the rear end of the vehicle to the position indicated generally in FIG. 2, lowering the front or loading-unloading end substantially to ground level. The vehicle is now moved forwardly by energizing the driving motors for the wheels 21 while at the same time the conveyor is energized to move rearwardly. The conveyor thus is simultaneously moved underneath the module to be lifted while the vehicle is moving forwardly while the conveyor is moving rearwardly, resulting in lifting the module rather than shifting it to any substantial degree. This is an important function of our vehicle inasmuch as these modules can be torn apart if stretched or, can be compressed so that they bulge or otherwise become distorted.

It will be seen that the single frame made up of the members 11 and the suitable cross bracing and plates serves both to support the conveyor chain and as the chassis frame. This also permits the use of a single conveyor as distinguished, in some instances, in vehicles of this general type, from two conveyors. Also, by the use of the combined or single frame we are enabled to reduce the height of the conveyor supporting structure. Our vehicle is also small in size, may be constructed with a short wheel base and the steerable wheels may be located fairly close to the pick-up-discharge end, near the operator's cab so that the operator has accurate control over the placing of the vehicle relative to the module. Still further, our invention is characterized by the fact that it can pick up a module of cotton either from the pallet or ground and can discharge either onto a conveyor, a pallet, or onto the ground. The capability of removing modules of seed cotton from pallets has the overall effect of reducing the requirement for the pallets, numberwise.

Referring now particularly to FIGS. 15 to 18, inclusive, we show a slightly modified form of our invention. In this instance the frame 10 is fixed to the cross members 80 of the rear wheels 32. The steerable wheels 21 are mounted directly beneath the pivoting mechanisms 81 which are mounted on horizontal, overhead members 82. The hydraulic cylinders 42 are pivotally connected at 83 to cross members 84 and the piston rods 86 thereof are connected as indicated to ears carried by the overhead framework. The steering of the wheels 21 is still accomplished by the hydraulic cylinders 26.

The modification just described is substantially the same as the one previously described except that the frame 10 is raised and lowered vertically relative to the front wheels instead of relative to the rear wheels. Except for this change the advantages, construction and otherwise, of our invention are the same as that already described.

In view of the foregoing it will be seen that we have devised an improved vehicle especially adapted to lift, transport and discharge modules of seed cotton in an efficient, time-consuming manner.

While we have shown our invention in but two forms, it will be obvious to those skilled in the art that it is not so limited, but is susceptible of various other changes and modifications without departing from the spirit thereof.

What we claim is:

1. In apparatus for picking up from the ground a mass of material such as a module of seed cotton,
    (a) a vehicle having a single elongated frame disposed to function both as a chassis frame and a conveyor frame,
    (b) conveyor elements mounted directly on the upper surface of said frame and disposed to receive the load to be handled,
    (c) sets of fore and aft wheels for supporting the frame,
    (d) means securing the frame against substantial vertical movement to a first set of said wheels,
    (e) arms for the second set of wheels pivotally mounted adjacent one end to the frame, the wheels of said second set of wheels being mounted on said arms adjacent adjacent their opposite ends,
    (f) a fluid pressure cylinder for each wheel of said second set of wheels operatively interposed between the frame and the wheel carrying ends of said arms whereby the frame adjacent said second set of wheels may be raised and lowered vertically relative thereto thus to lower one end of the conveyor substantially to ground level for the reception of a load to be lifted and moved, and
    (g) fluid transfer means interconnecting one end of each cylinder with the corresponding end of the other cylinder, whereby when operating on uneven terrain torsional forces on the frame are substantially eliminated.

2. Apparatus as defined in claim 1 in which there are sensing means located adjacent the end of the conveyor to be lowered substantially to ground level and means connecting said sensing means to said fluid pressure cylinders effective to stop the lowering of said end of the conveyor toward the ground at a predetermined level.

3. In apparatus for picking up from the ground a mass of material such as a module of seed cotton,
    (a) a vehicle having a single elongated frame disposed to function both as a chassis frame and a conveyor frame,
    (b) conveyor elements mounted directly on the upper surface of said frame and disposed to receive the load to be handled, (c) sets of first and second wheels for supporting the frame, the first set of said wheels being set back from the adjacent end of the frame, (d) means securing the frame against substantial vertical movement to said first set of said wheels, (e) arms for the second set of wheels pivotally mounted adjacent one end to the frame, the wheels of said second set of wheels being mounted on said arms adjacent their opposite ends, and (f) power means operatively interposed between the frame and the wheel carrying ends of said arms whereby the frame adjacent said second set of wheels may be raised vertically relative thereto thus to lower the end of the frame which projects past said first set of wheels thereby to lower that end of the conveyor substantially to ground level for the reception of a load to be lifted and moved.

* * * * *